April 26, 1960 C. B. SJÖHOLM 2,934,311
REGULATING VALVE
Filed June 14, 1955 2 Sheets-Sheet 1
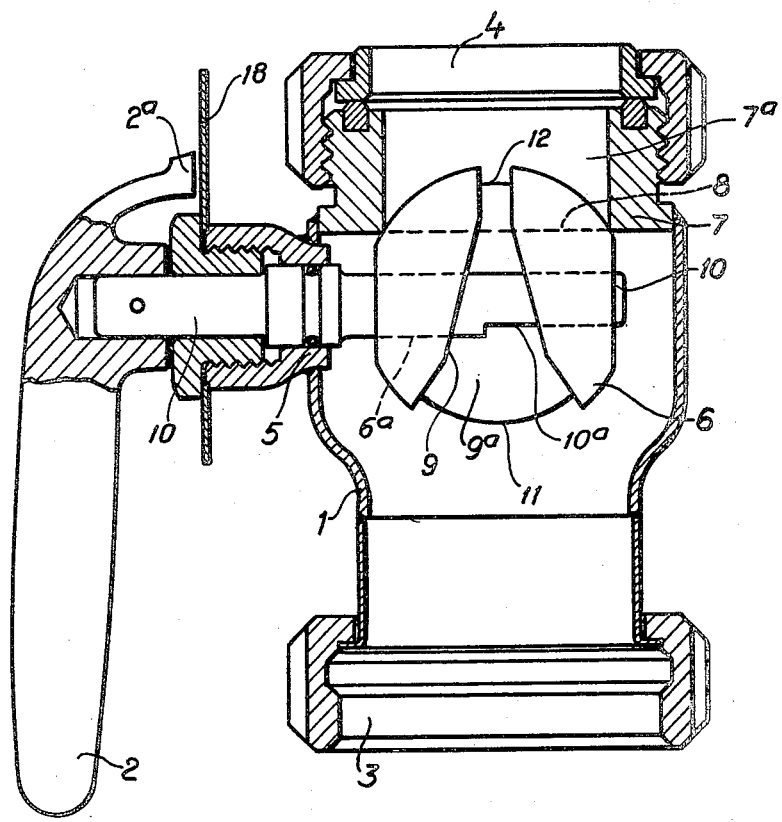
Fig. I
INVENTOR
Claes Bertil Sjöholm
BY
Davis, Harper & Faithfull
ATTORNEYS

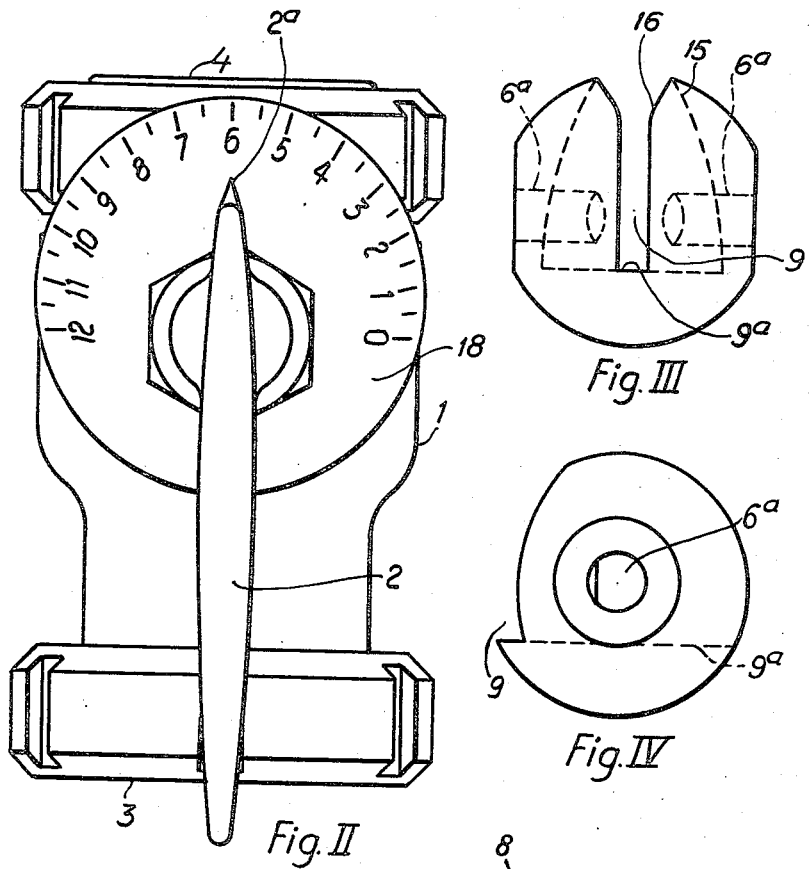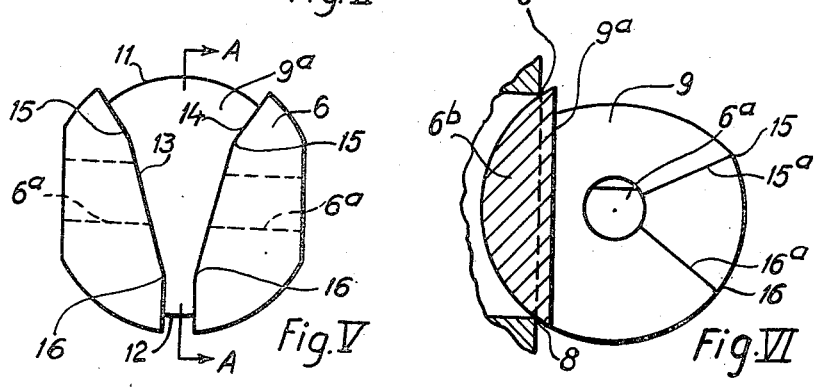

United States Patent Office 2,934,311
Patented Apr. 26, 1960

2,934,311

REGULATING VALVE

Claes Bertil Sjöholm, Malmo, Sweden, assignor to Aktiebolaget Separator, Stockholm, Sweden, a corporation of Sweden Application June 14, 1955, Serial No. 515,433

Claims priority, application Sweden June 30, 1954

2 Claims. (Cl. 251—209)

This invention relates to regulating valves of the type having a rotatable valve member or plug forming a fluid passage which is variable as to through-flow area by rotation of the valve member. The invention has particular reference to an improved regulating valve of this type in which the regulating area is substantially in excess of the usual 90° turning of the adjusting handle for the valve and in which the relation between the turning angle and the through-flow area provided by the valve is substantially linear.

In regulating valves as commonly made, the through-flow valve member is a rotatable disc or a conical plug having a hole bored through it, usually at right angles to the axis of the rotatable member. Such valves have the disadvantage that the regulation is limited to approximately a 90° turning of the adjusting handle for the valve member, and the relation between the turning angle and the through-flow area of the valve is non-linear.

The principal object of the present invention is to provide a regulating valve in which these disadvantages are overcome.

According to the invention, the rotatable valve member is in the form of a ball or sphere having a groove in part of the periphery of the ball, and the ball is rotatably mounted in a valve housing where it makes contact with the circular end of a passage forming an inlet or outlet of the housing. In one angular position of the ball valve member, the groove is displaced from the circular end of the passage against which the ball seats; and as the ball is turned from this closed position, the groove presents a through-flow connection having a cross sectional area which increases linearly with the extent of turning of the ball valve member on its rotation axis.

For a better understanding of the invention, reference may be had to the accompanying drawings, in which Fig. I is a vertical sectional view of the new regulating valve in a preferred form;

Fig. II is a front elevational view of the valve shown in Fig. I;

Fig. III is a view of the ball valve member shown in Fig. I, but as viewed from below in Fig. V;

Fig. IV is an end view of the ball valve member, as viewed from the left in Fig. III;

Fig. V is a view of the ball valve member shown in Fig. I as seen from the opposite side of the valve when the valve member has been rotated through 180°, and Fig. VI is a sectional view on the line A—A in Fig. V, showing the ball in its valve-closing position relative to its seat.

Referring to the drawings, the reference numeral 1 designates a valve housing, and the reference numeral 2 designates the valve adjusting member or handle outside the housing. At its lower end, the valve housing has a pipe connection 3 forming an inlet to the housing. A pipe connection 4 at the upper end of the housing forms an outlet from the latter. In one side of the housing is a hollow stationary fitting 5 secured in any suitable manner to the housing, as by welding. A shaft 10 extends into the housing through the fitting 5, the handle 2 being secured to the outer end of the shaft for rotating the latter in the fitting 5. At its inner end, the rotatable shaft 10 carries a ball-shaped valve member 6.

At its outlet end, the valve housing 1 has a hollow cylindrical member 7 forming an outlet passage 7a for connecting the interior of the housing with the outlet pipe connection 4. The inner end of passage 7a forms a circular seat 8 for the ball valve 6, the seat 8 being of somewhat smaller diameter than the ball 6. Thus, the main portion of ball 6 is disposed within the main portion of housing 1, while part of the ball protrudes beyond the seat 8 and into the passage 7a. The ball 6 has a central opening 6a (Figs. IV, V and VI) through which the shaft 10 extends at right angles to the axis of passage 7a. The shaft has a close fit in the opening 6a and has a flattened portion 10a engaging a corresponding flat wall of the opening 6a, to prevent accidental displacement of the ball relative to the shaft.

The ball 6 is formed with a peripheral groove 9 extending around the axis of shaft 10 through about 250° of the ball circumference. The groove 9 is substantially funnel-shaped and is cut deeply into the ball, that is, about two-thirds of the ball diameter, as best shown in Figs. III, IV and VI. Due to this depth of the groove 9, the ball opening 6a is interrupted intermediate its ends by the groove so that the shaft 10 is exposed in the groove, as shown in Fig. I. The groove 9 has a plane bottom 9a which, as shown in Figs. I and V, narrows from a wide end 11 to a narrow end 12, these ends being in the form of arcs. The sides 13 and 14 of the groove 9 are refracted, and each of these two sides has two refraction points 15 and 16 opposite corresponding refraction points of the other side, as shown in Fig. V. These refraction points correspond in Fig. VI to the refraction lines 15a and 16a, respectively, which actually present rounded rather than sharp edges and are shown as lines in Fig. VI only for illustrative purposes. The widening of groove 9 at the top of Fig. III corresponds to the rounding of the edges of the refracted sides 13 and 14 between their respective refraction points 15 and 16 in Fig. V.

Starting from the narrow end 12 of groove 9 and following it around the periphery of ball 6, it will be observed that the groove presents parallel side edges between the end 12 and the refraction points 16. The side edges then diverge at an angle of about 30° to each other from the refraction points 16 to the refraction points 15, and then they diverge at a substantially greater angle from the refraction points 15 to the wide end 11 of the groove. The cross-hatched part 6b of the ball (Fig. VI) is the spherical segment forming the bottom 9a of the groove and which, as will be presently described, serves to prevent flow through the valve when handle 2 is in the "off" position.

As previously mentioned, the circular edge 8 of the outlet passage 7a forms a seat for the ball valve 6, so that a spherical segment of the ball will protrude into the passage 7a. To close the valve, the handle 2 is rotatable to the "off" position (wherein the pointer 2a on the handle is opposite the "0" marking of the dial 18 in Fig. II), whereby the spherical segment 6b of the ball makes contact with the seat 8 around the entire circumference of the latter, as indicated in Fig. VI. In this "off" position of the ball valve, no part of its groove 9 is within the outlet passage 7a, so that there can be no flow of fluid between the inlet pipe connection 3 and the outlet pipe connection 4.

Assuming now that the ball valve is turned clockwise as viewed in Fig. VI (counterclockwise in Fig. II), the narrow end 12 of the groove 9 will move past the seat 8 and into the outlet passage 7a, thereby allowing passage of fluid from the main part of the housing through the groove 9 and into the outlet passage 7a. As rotation of the ball valve continues, a progressively greater length of the narrow portion of groove 9 will enter the passage 7a so as to increase the throughflow area. In other words, the narrow portion of the groove between its reduced end 12 and the refraction point 16 provides a rectangular throughflow area of constant width which increases in length as rotation of the ball valve is continued, until the rectangular area within the passage 7a extends diametrically across the seat 8 (from bottom to top in Fig. VI). If the width of the groove 9 were constant throughout, further rotation of the ball valve would not increase the rectangular throughflow area once the end 12 of the groove had reached the seat 8 at a point diametrically opposite the point at which this end of the groove first entered the passage 7a. However, since the sides of the groove diverge between the refraction points 16 and 15, such further rotation of the ball valve results in a gradual increase in the width of the groove adjacent the seat 8 (at the bottom in Fig. 6) so that the effective throughflow area continues to increase. As this rotation of the ball valve continues, the valve seat 8, due to its circular form, begins to reduce the effect of the constantly widening groove opening. This reduction in the progressive enlargement of the effective throughflow area is compensated, however, by the fact that the sides of the groove, between the refraction points 15 and the wide end 11 of the groove, diverge at a substantially greater angle from each other as compared with the divergencies of these sides between the refraction points 16 and 15.

This functioning of the ball valve member 6 can perhaps be understood more readily by assuming that the outline of the groove 9 is developed in a plane and is displaced inward over the circular opening or valve seat 8, this displacement corresponding to the action which occurs when the handle 2 is rotated from the "off" position. At first, the groove contour within the area of the circulator opening or seat 8 is rectangular with constant width and increases in length as the displacement continues, until the rectangular area extends diametrically across the entire opening 8. At about this point, the width of the groove 9 entering the area surrounded by the seat 8 begins to increase with further inward displacement of the groove outline, thereby further increasing the effective throughflow area. This progressive widening of the groove outline entering the area within the seat 8 continues through the displacement represented by the angular displacement between the refraction points 16 and 15. Thereupon, the rate of widening of the groove outline entering this area increases substantially per unit of displacement, due to the increased angle of divergence of the sides of the groove from the refraction points 15 to the large end 11 of the groove. The maximum throughflow rate is obtained when this large end of the groove is about to enter the area within the seat 8.

The throughflow area for the valve is thus determined by coaction between the circular opening or seat 8 and that portion of the groove 9 of the ball valve which lies within the passage 7a, that is, at the outlet side of the seat 8. However, there is another factor which is significant. When the ball 6 is turned from its closed to its open position, the spherical segment 6b (which makes contact with seat 8 around its entire perimeter in the closed position) does not initially influence the throughflow rate through the valve, but this segment will gradually assume a position crosswise over the effective throughflow area, although at a distance therefrom. At the beginning of the valve opening, the fluid to be regulated flows through the groove 9 of the ball from one side of the spherical segment 6b and out through that portion of the circular opening or seat 8 which is uncovered. The valve opening will eventually progress to the point where the spherical segment 6b is entirely removed from the passage 7a (from the outlet side of seat 8), at which time the fluid will flow into the ball groove 9 from both sides of the spherical segment 6b and thence through the uncovered portions of the seat 8. The uncovering of the seat portion diametrically opposite the seat portion which was initially uncovered will, of course, increase the throughflow area. Because of the great depth of the groove 9 in the ball, the supply of fluid is insured to that portion of the valve opening which is uncovered when the spherical segment 6b is entirely displaced from within the seat 8. Thus, due to the substantial depth of the groove 9 in the ball, as previously described, and the correspondingly small spherical segment 6b, the valve of the present invention can effect control of the throughflow rate through a large angle of rotation of the shaft 10 which carries the ball valve member.

It will be apparent that when the valve is closed (Fig. VI), the pressure of the fluid in housing 1 forces the ball 6 against the seat 8, thereby contributing to a good sealing. By rounding or filleting the corners formed by the ball groove 9, disturbances of the fluid flow through the valve are avoided or reduced, and cleaning of the ball valve member is facilitated.

I claim:

1. In a regulating valve having a housing provided with fluid inlet and outlet passages, a circular valve seat through which one of said passages opens into the housing and which affords communication from said inlet to said outlet passage, and a regulating shaft rotatable in the housing, the improvement which comprises a ball in the housing rotatable with said shaft and having a diameter greater than that of the seat, the ball being held against the seat by the shaft and having a spherical segment disposed in said one passage, the ball having a generally funnel-shaped groove extending through the ball and across the rotation axis thereof whereby one end of the groove is substantially narrower than the other end, the groove extending over the greater portion of the cross-section of the ball taken in a plane normal to said axis and through the center of the ball, whereby the groove subtends about said axis an angle substantially greater than 180°, the ball having a spherical valve-closing segment including a minor portion of said cross-section and adapted to engage the seat continuously around the seat to close the valve in one position of the shaft, the groove having opposed side walls extending along said valve-closing segment from the narrower end of the groove to the wider end thereof, the groove having a portion of substantially constant width extending from said narrower end, a second portion extending from said first portion and in which the sides of the groove diverge from each other, and a third portion extending from said second portion toward the wider end of the groove, the sides of said third portion diverging from each other at a substantially greater angle than do the sides of said second portion, whereby the groove is adapted to enter said one passage progressively starting with said narrower end and thereby effect a substantially linear increase in the throughflow area between said inlet and outlet passages, even when said valve-closing segment moves into the flow path, as the shaft is rotated from said one position through more than 180°.

2. In a regulating valve having a housing provided with fluid inlet and outlet passages, a circular valve seat through which one of said passages opens into the housing and which affords communication from said inlet to said outlet passage, and a regulating shaft rotatable in the housing, the improvement which comprises a ball in the housing rotatable with said shaft and having a diameter greater than that of the seat, the ball having its spherical surface engaged only by said circular seat and being held against the seat by the shaft with a spherical segment of the ball disposed in said one passage, the ball having a generally funnel-shaped groove extending through the ball and across the rotation axis thereof whereby one end of the groove is substantially narrower than the other end, the groove having a substantially flat bottom situated at a maximum depth greater than the ball radius, whereby the groove subtends about said axis an angle substantially greater than 180°, the ball having a spherical valve-closing segment less than half the size of the ball and forming said bottom of the groove, said valve-closing segment being adapted to engage the circular seat continuously around the seat to close the valve in a closing position of the shaft, the opposed side walls of the groove extending to said bottom and being substantially parallel along a portion of the groove adjacent said narrower end, said side walls diverging from said groove portion to said wider end, whereby rotation of the shaft in one direction through more than 180° from said closing position first opens a flow path which extends along one side of said valve-closing segment and which gradually increases in throughflow area, and then opens a second flow path extending along an opposite side of said valve-closing segment while maintaining said first path, said diverging walls causing the combined throughflow areas of the paths to increase with said rotation of the shaft after the second path is opened.

References Cited in the file of this patent

UNITED STATES PATENTS

| | | |
|---|---|---|
| 1,784,381 | O'Stroske | Dec. 9, 1930 |
| 2,067,346 | Rovinsky | Jan. 12, 1937 |

FOREIGN PATENTS

| | | |
|---|---|---|
| 21,477 | Great Britain | of 1911 |
| 200,898 | Switzerland | Jan. 16, 1939 |